(12) United States Patent
Rao (10) Patent No.: US 9,391,818 B1
(45) Date of Patent: Jul. 12, 2016

(54) PILOT SEQUENCE DESIGN FOR WIRELESS COMMUNICATIONS

(71) Applicant: NATIONAL INSTRUMENTS CORPORATION, Austin, TX (US)

(72) Inventor: Yong Rao, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 14/856,736

(22) Filed: Sep. 17, 2015

(51) Int. Cl.
*H04L 7/06* (2006.01)
*H04L 25/03* (2006.01)
*H04L 25/02* (2006.01)
*H04J 13/00* (2011.01)

(52) U.S. Cl.
CPC ....... *H04L 25/03159* (2013.01); *H04J 13/0059* (2013.01); *H04L 25/0226* (2013.01); *H04L 25/0256* (2013.01)

(58) Field of Classification Search
CPC .............. H04B 1/707; H04B 1/70735; H04B 2201/70701; H04B 1/7077; H04B 1/70; H04L 27/2035; H04L 27/2275; H04L 5/06; H04L 25/497; H04L 27/368; H04L 25/03343; H04L 25/05; H04L 7/042; H04L 7/10; H04L 7/027; H04L 7/06; H04L 7/0331; H03F 1/3247; H03F 1/3294; H03F 2201/3233; H04J 3/07; H04J 3/076; H04J 3/073; H04J 3/0632
USPC .................. 375/130–153, 224–236, 259–285, 375/295–352, 354–376
See application file for complete search history.

(56) References Cited

U.S. PATENT DOCUMENTS

| | | | | | |
|---|---|---|---|---|---|
| 5,970,397 A | * | 10/1999 | Klank | ....................... | H04L 5/06 455/139 |
| 6,721,299 B1 | * | 4/2004 | Song | ...................... | H04B 1/707 370/342 |
| 7,808,886 B2 | * | 10/2010 | McCoy | ............... | H04L 27/2613 370/208 |
| 8,000,228 B2 | * | 8/2011 | McCoy | ............... | H04L 27/2613 370/208 |

(Continued)

OTHER PUBLICATIONS

3GPP TSG RAN WG1 #49, Kobe, Japan, May 7-11, 2007, "Design of CAZAC Sequences for Small RB Allocations in E-UTRA UL", Texas Instruments, R1-072206.*

(Continued)

*Primary Examiner* — James M Perez
(74) *Attorney, Agent, or Firm* — Meyertons Hood Kivlin Kowert & Goetzel, P.C.; Jeffrey C. Hood; Michael B. Davis (57) ABSTRACT

Techniques are disclosed relating to generating pilot sequences for channel estimation and/or equalization. In some embodiments, a generated pilot sequence has a flat frequency response, a null portion, and low autocorrelation. In some embodiments, a method for generating the pilot sequence includes: starting with a Constant Amplitude Zero Autocorrelation (CAZAC) sequence and iteratively performing, until the result has a flat magnitude: padding the sequence with zeros, determining whether a frequency transform (FT) of the zero-padded sequence has a flat magnitude, adjusting a phase of a second sequence (that has a desired frequency response) to match a phase of the FT, determining an inverse FT of the adjusted second sequence and using a result of the inverse FT as the sequence for the next iteration. The disclosed techniques may allow efficient production of pilot sequences for use in cellular networks, for example.

20 Claims, 5 Drawing Sheets

(56) References Cited

U.S. PATENT DOCUMENTS

| | | | | |
|---|---|---|---|---|
| 8,149,958 B2* | 4/2012 | Hooli | H04J 13/0062 | 375/340 |
| 8,238,458 B2* | 8/2012 | Sethia | H04L 27/2647 | 327/551 |
| 8,279,978 B2* | 10/2012 | McCoy | H04L 27/2613 | 370/208 |
| 8,363,540 B2* | 1/2013 | McCoy | H04L 27/2613 | 370/208 |
| 9,136,966 B2* | 9/2015 | McCoy | H04L 27/2613 | |
| 9,136,996 B2* | 9/2015 | Kawamura | H04L 5/0053 | |
| 2005/0018750 A1* | 1/2005 | Foerster | H04B 1/69 | 375/130 |
| 2006/0291431 A1* | 12/2006 | Pajukoski | H04L 27/262 | 370/335 |
| 2007/0047676 A1* | 3/2007 | MacLeod | G01S 7/414 | 375/341 |
| 2007/0165588 A1* | 7/2007 | McCoy | H04L 27/2613 | 370/344 |
| 2007/0201408 A1* | 8/2007 | Tiirola | H04B 1/69 | 370/335 |
| 2008/0318528 A1* | 12/2008 | Hooli | H04J 13/0062 | 455/62 |
| 2009/0003472 A1* | 1/2009 | Dent | H04L 25/03834 | 375/260 |
| 2009/0097465 A1* | 4/2009 | Inoue | H04J 13/0077 | 370/342 |
| 2009/0116587 A1* | 5/2009 | Kwasinski | H04L 27/2613 | 375/340 |
| 2010/0322226 A1* | 12/2010 | McCoy | H04L 27/2613 | 370/344 |
| 2011/0299380 A1* | 12/2011 | McCoy | H04L 27/2613 | 370/208 |
| 2011/0299384 A1* | 12/2011 | McCoy | H04L 27/2613 | 370/210 |
| 2013/0201982 A1* | 8/2013 | McCoy | H04L 27/2613 | 370/344 |
| 2016/0006524 A1* | 1/2016 | McCoy | H04L 27/2613 | 370/344 |

OTHER PUBLICATIONS

Hua, Min et al.—"Analysis of the Frequency Offset Effect on Zadoff-Chu Sequence Timing Performance" IEEE Transactions on Communications, vol. 62, Issue 11, Oct. 23, 2014; pp. 4024-4039 (25 pages).

Muquet, Bertrand et al.—"OFDM with Trailing Zeros Versus OFDM with Cyclic Prefix: Links, Comparisons and Application to the Hiperlan/2 System" 2000 IEEE, Proceedings of the International Conference on Communications, vol. 2, Jun. 2000, New Orleans, USA, pp. 1049-1053 (5 pages).

van Waterschoot, Toon et al.—"Analytical Expressions for the Power Spectral Density of CP-OFDM and ZP-OFDM Signals" IEEE Signal Processing Letters, vol. 17, Issue 4, Jan. 15, 2010 (10 pages).

* cited by examiner

FIG. 1

| CAZAC sequence 210 | Zero Padding 220 |

PILOT SEQUENCE DESIGN FOR WIRELESS COMMUNICATIONS

TECHNICAL FIELD

Techniques are disclosed relating to wireless communications and more specifically to generating pilot sequences for channel estimation and/or equalization.

DESCRIPTION OF THE RELATED ART

Pilot symbols are often used in wireless communications to estimate channel conditions. In particular, using a known pilot may allow communicating devices to determine how a signal propagates from transmitter to receiver including effects of scatter, fading, power decay with distance, etc. Minimum mean square error (MMSE) is one example of a common estimation method. Pilot sequences preferably have a flat magnitude frequency response, e.g., for optimal MMSE estimation across frequencies. Pilot sequences also preferably have zero or low autocorrelation and low cross-correlation among different sequences (e.g., sequences assigned to different mobile devices in a given communications cell).

Cyclic prefixes are often used for pilot symbols, by prefixing the symbol with a repetition of the end of the signal. The cyclic prefix (CP) may serve as a guard interval to reduce inter-symbol interference and may allow linear convolution of a frequency-selective multipath channel to be modelled as circular convolution. This in turn may allow for simple frequency-domain processing to determine channel estimation and equalization.

In some applications, a null CP (e.g., with values of zero which may also be referred to as zero padding) may be preferred. This may facilitate beam switching, symbol recovery regardless of channel zero locations, etc. When used with orthogonal frequency division multiplexing (OFDM), this may be referred to a zero-padding OFDM (ZP-OFDM), and similar techniques may be used for non-OFDM communications. Using zero padding, however, may interfere with the desirable properties of a pilot sequence. For example, zero padding may result in a non-flat frequency response. Therefore, efficient techniques for generating pilot sequences that use zero padding are desired.

SUMMARY

Techniques are disclosed relating to generating pilot sequences for channel estimation and/or equalization. In some embodiments, a generated pilot sequence has a flat frequency response, zero padding, and low autocorrelation. In some embodiments, a method for generating the pilot sequence includes: starting with a Constant Amplitude Zero Autocorrelation (CAZAC) sequence and iteratively performing, until the result has a flat magnitude: padding the sequence with zeros, determining whether a frequency transform (FT) of the zero-padded sequence has a flat magnitude, adjusting a phase of a second sequence (that has a desired frequency response) to match a phase of the FT, determining an inverse FT of the adjusted second sequence and using a result of the inverse FT as the sequence for the next iteration.

In some embodiments, an apparatus (e.g., a cellular network element) is configured to transmit the pilot sequence, which may then be used for channel estimation and/or equalization. In some embodiments, a computer-readable non-transitory medium stores program instructions that are executable to cause a computing device to generate the pilot sequence.

The disclosed techniques may allow efficient production of pilot sequences for use in cellular networks, for example.

While the disclosure is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present disclosure as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

DETAILED DESCRIPTION

Figure 1:
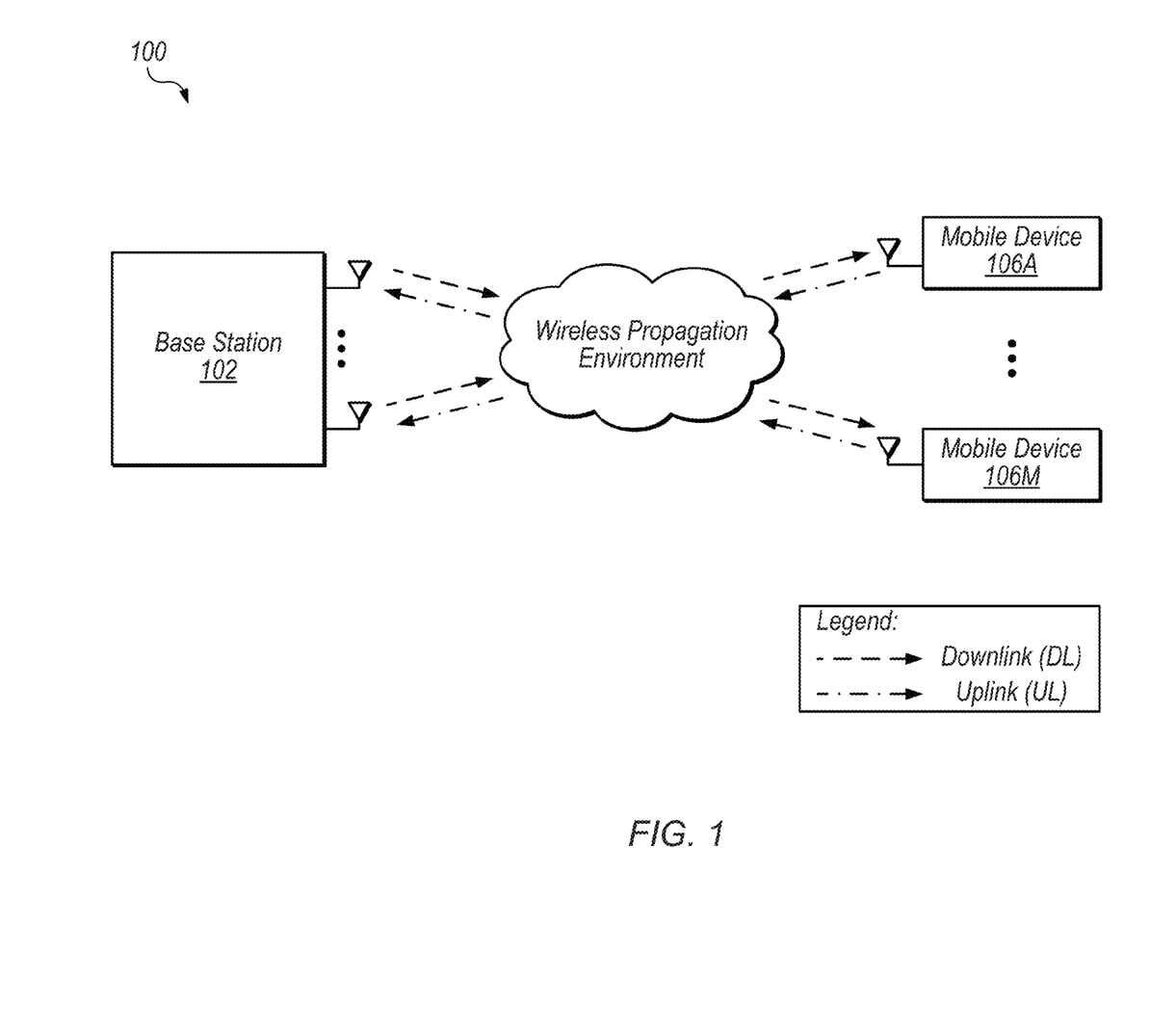
FIG. 1 illustrates exemplary wireless communications between a base station and multiple mobile devices.

This disclosure initially describes, with reference to FIG. 1, an exemplary wireless propagation environment that includes exemplary mobile device and an exemplary base station. Embodiments of pilot sequences with various properties and techniques for generating such sequences are discussed with reference to FIGS. 2-6. In some embodiments, the disclosed techniques may facilitate efficient production of pilot sequences that have a flat frequency response and that are useful for channel estimation and fractionally-spaced frequency domain equalization.

Exemplary Wireless Communication System

FIG. 1 shows an exemplary wireless communication system 100 that includes base station 102 and M mobile devices 106A-M (which may also be referred to as user equipment devices or UEs 106A-M). In the illustrated embodiment, base station 102 includes N antennas configured to transmit and receive data with mobile devices 106. In some embodiments, base station 102 may use time-division duplexing (TDD) or frequency-division duplexing (FDD), for example, to communicate with the different mobile devices. In the some embodiments, base station 102 is a multiple input multiple output (MIMO) base station, but in other embodiments non-MIMO techniques may be implemented.

Note that in some embodiments, techniques similar to those described below may be applied to various types of communications channels including non-cellular channels, wired channels, etc. Further, in some embodiments, similar techniques may be applied to storage using one or more potentially lossy storage mediums, where data to be written is encoded and data being read is decoded. This may improve data integrity in data-center applications, e.g., in conjunction with redundant storage. Thus, the disclosed system is included for exemplary purposes and is not intended to limit the scope of the disclosure.

In system 100, mobile devices 106 may concurrently communicate with base station 102 via the wireless propagation environment. In some embodiments, network elements are configured to perform channel estimation and/or fractionally-spaced frequency domain equalization (FS-FDE). In some embodiments, known pilot sequences are transmitted and used for such estimation and/or equalization.

Zero-Padded Sequences

In Long Term Evolution (LTE) networks, pilot sequences are typically Zadoff-Chu (ZC) sequences, which is a special type of Constant Amplitude Zero Autocorrelation (CAZAC) sequence. CAZAC sequences are complex-valued periodic sequences with cyclic autocorrelation equal to zero. In more-recent wireless technologies (e.g., 5G technologies), null portions may be desired in pilot sequences (e.g., a null cyclic prefix), where "null" refers to values of zero in the sequence. Zero padding may allow use of circular convolution to obtain linear convolution results and/or may have a guard property that facilitates beach switching, for example, among other advantages. Using zero padding with a CAZAC sequence, however, may result in an undesirable frequency response.

Figure 2:
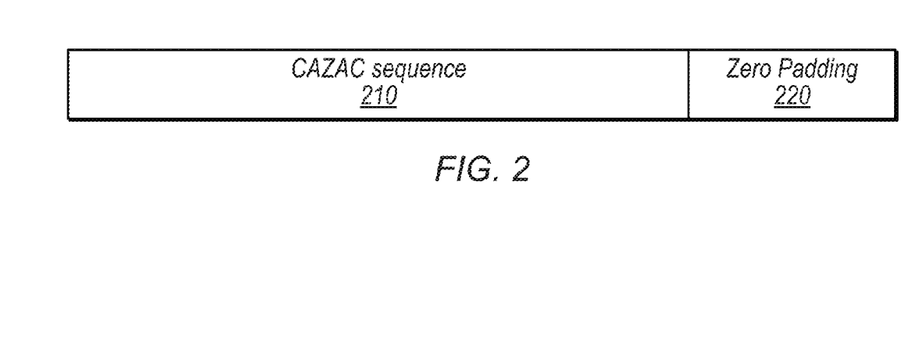
FIG. 2 illustrates an exemplary padded CAZAC sequence, according to some embodiments.

FIG. 2 illustrates an example CAZAC sequence 210 that is padded with zeros (portion 220). In various embodiments, the padding may be added to the beginning (not explicitly shown), middle (not explicitly shown), and/or end (as shown) of sequence 210. In some embodiments, the sequence may be truncated before padding, e.g., such that the padded sequence has the same length as the original sequence. In other embodiments, sequence 210 is shorter than a desired sequence length and zeros are added to the sequence to achieve a desired sequence length. Thus, "zero padding" may refer to adding zeros to a sequence without otherwise modifying the sequence and/or to truncating the sequence and then adding zeros to replace truncated portions.

Figure 3:
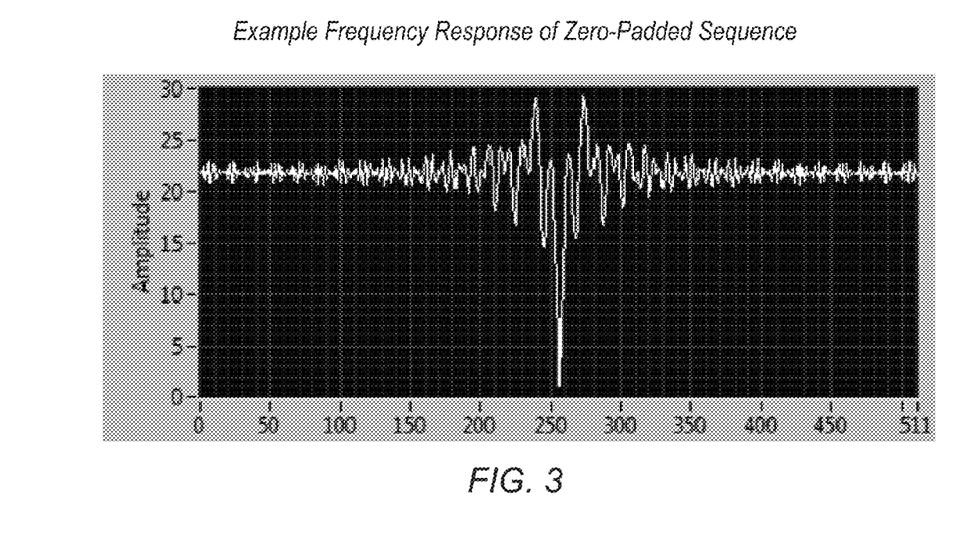
FIG. 3 illustrates the frequency response of an exemplary padded CAZAC sequence, according to some embodiments.

FIG. 3 illustrates an exemplary frequency response of the zero-padded sequence of FIG. 3. As shown, the magnitude of the frequency response is not flat, having a greater magnitude for some frequency bins than for others. In the illustrated embodiment, the FFT size is 512, but any appropriate FFT sizes may be used in various embodiments. As used herein, the term "flat" in the context of a frequency response (e.g., a Fast Fourier Transform (FFT) result) may refer to a situation in which the response is literally flat (e.g., such that each frequency bin of an FFT result has exactly the same magnitude) or in which the response is flat to within some threshold requirement (e.g., a threshold distance between the magnitudes of the greatest and lowest frequency bins, a threshold distance from an average magnitude, a threshold standard deviation, etc.). In some embodiments, the disclosed techniques have a convergence property such that the frequency response of an output sequence is literally flat. A flat frequency response is typically desirable for channel estimation and equalization.

Techniques for Generating Zero-Padded Sequences

Figure 4:
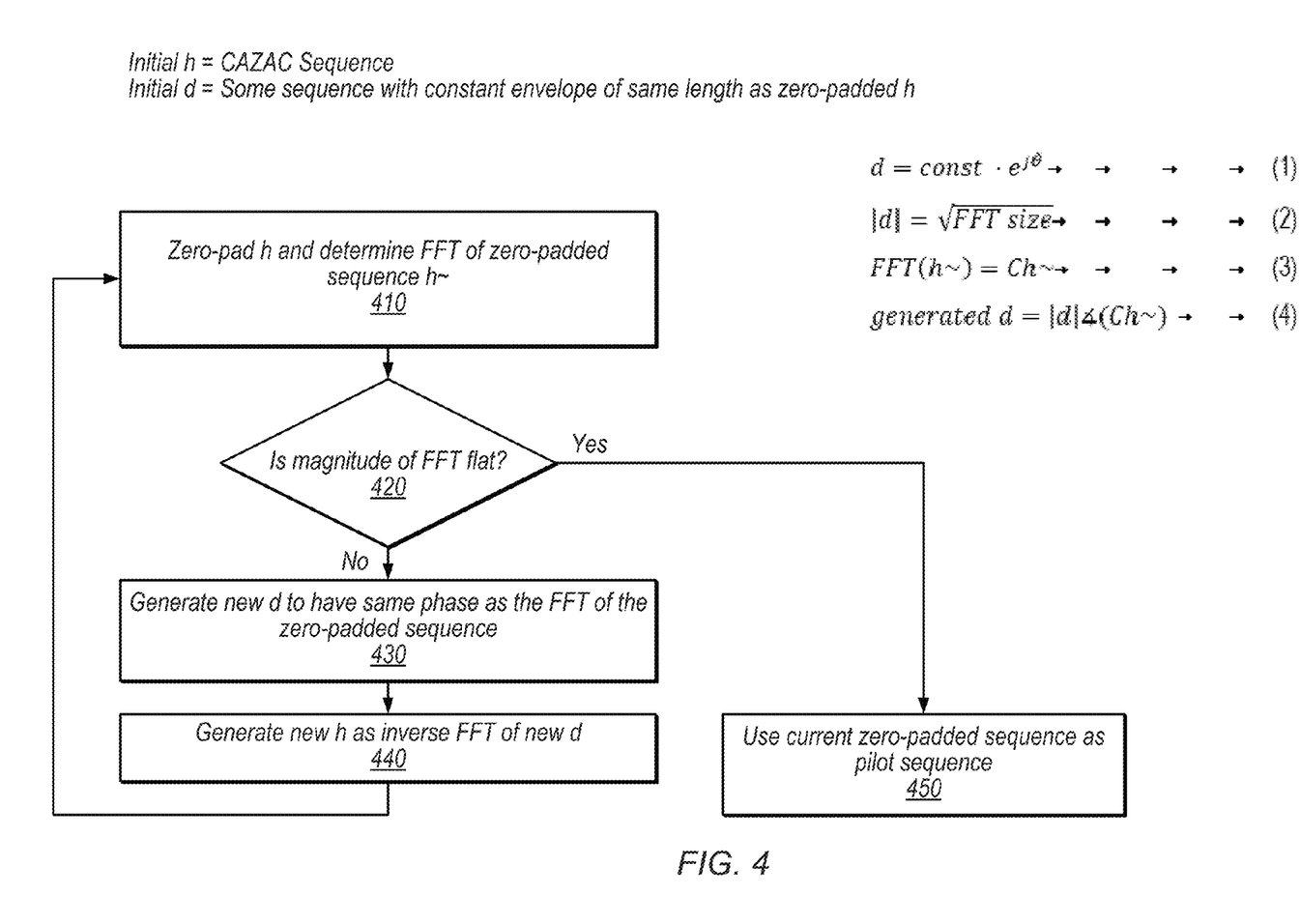
FIG. 4 illustrates a method for generating a pilot sequence, according to some embodiments.

FIG. 4 illustrates a method for operating on a zero-padded CAZAC sequence (such as that shown in FIG. 2, for example) to generate an output sequence with a flat frequency response, null portion(s), and zero autocorrelation across all non-zero lags, according to some embodiments. For example, performing the method using sequence 210 as an input may produce an output sequence with a flat frequency response rather than the undesirable frequency response of FIG. 3.

The method shown in FIG. 4 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Flow begins at 410.

As shown in FIG. 4, an initial sequence h is a CAZAC sequence (which may also be a ZC sequence), in some embodiments. Another initial sequence d is a sequence with a constant envelope and a desired frequency response. Sequence d has the same length as a zero-padded sequence h, in some embodiments.

At 410, a computing device zero-pads h and determines an FFT of the zero-padded sequence.

At 420, the computing device determines whether a magnitude of the FFT is flat. This determination may be made based on whether the magnitude is literally flat or is flat to within some acceptable threshold parameter. If the magnitude is flat, the method proceeds to 450 in the illustrated embodiment, and the current zero-padded sequence is used as an output pilot sequence. If the magnitude is not flat, the method proceeds to 430.

At 430, the computing device generates a new d by adjusting the phase of the current d to have the same phase as the FFT of the zero-padded sequence. As shown in equation (1) of FIG. 4, d may be represented as a constant times $e^{j\Theta}$. Further, the absolute value of d equals the square root of the FFT size, in this embodiment, as shown in equation (2) of FIG. 4. If the FFT of a sequence is represented as Ch where C is a kernel matrix (equation (3)), then the generated d equals |d| ∡ (Ch~), where h~ is a zero-padded sequence, in this embodiment. This is because the phase of d is adjusted to equal that of Ch~ (the FFT of the zero-padded sequence), in the illustrated. In some embodiments, the actual initial sequence d is not particularly important, so long as it has the listed properties.

At 440, the computing device generates a new h as the inverse FFT of the new d. The method then proceeds back to 410 such that the illustrated operations are iteratively performed (using the new h for a next iteration) until the magnitude of the FFT is flat at 420.

The method of FIG. 4 may be thought of as a "shortcut" to determining a minimum value for $\||Ch|-|d|\|_2^2$ or $\||Ch|^2-|d|^2\|_2^2$, which are non-convex problems. In the shortcut, this problem is broken down into a sequence of convex problems by forcing d to have the same phase as Ch. Then, the problems may become equivalent to minimizing $\|Ch-\hat{d}\|$, (where $\hat{d}$ is a phase-adjusted d) which is performed iteratively in the method of FIG. 4.

Each iteration through elements 410-440 of FIG. 4 may result in a value of $\||Ch|-|d|\|_2^2$ that is less than or equal to the previous value, resulting in convergence to a zero-padded sequence with a flat frequency response.

In some embodiments, further constraining the time domain envelope of intermediate sequences may increase the peak to average power ratio (PAPR) of the pilot sequence. For example, in element 440, in some embodiments, the new h is constrained using a radius constraint, such that values in the new sequence are forced to fall within one or more constraint values.

Figure 5:
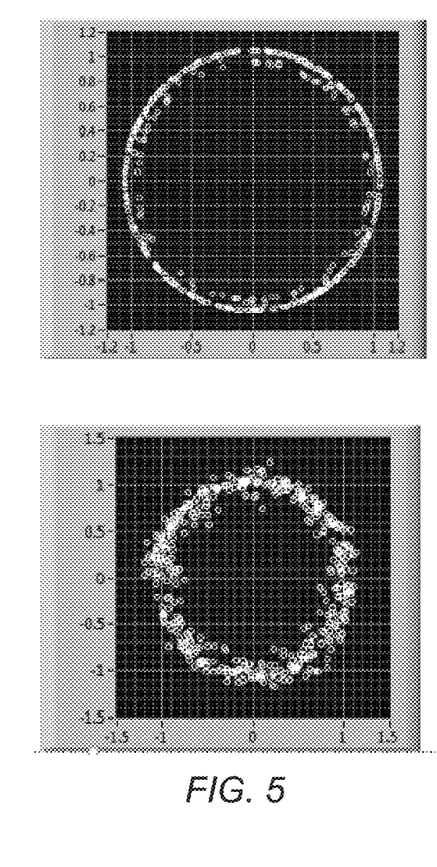
FIG. 5 illustrates a graph of a generated sequence using a constrained radius, according to some embodiments.

FIG. 5 shows polar graphs of a modified ZC sequence with an example radius constraint of 1/1.05 to 1.05 in the upper graph and no radius constraint in the lower graph. In other embodiments, any of various constraints may be imposed with different threshold values. As shown, the constraint may increase PAPR, which may be desirable in various embodiments.

Figure 6:
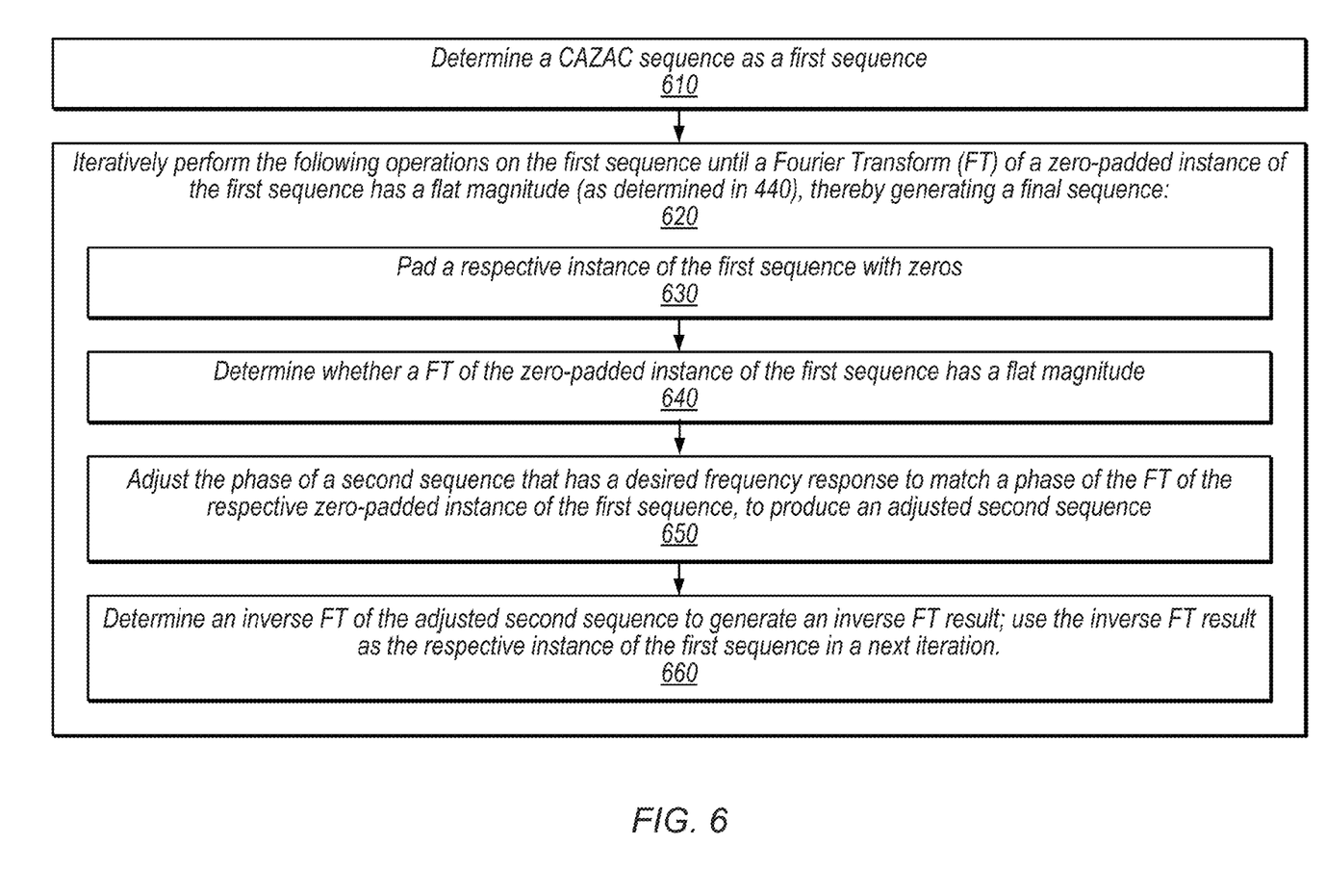
FIG. 6 illustrates generalized method for generating a pilot sequence, according to some embodiments.

FIG. 6 shows a generalized method for generating a pilot sequence with a null portion, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Flow begins at 610.

At 610, in the illustrated embodiment, a CAZAC sequence is determined as a first sequence. This may include receiving the CAZAC sequence (e.g., via a network or user input), generating the CAZAC sequence, accessing a stored CAZAC sequence from a memory, etc. The CAZAC sequence may be the length of a desired pilot sequence, in which case padding the sequence (e.g., in method element 630) may involve replacing truncated portions of the CAZAC sequence with zeros. In other embodiments, the CAZAC sequence may be shorter in length than the desired pilot sequence and may be padded (e.g., in method element 630) by adding zeros without truncation.

At 620, in the illustrated embodiment, method elements 630-660 are iteratively performed on the first sequence until a Fourier Transform (FT), e.g., an FFT of a zero-padded instance of the first sequence has a flat magnitude (as determined in method element 640), thereby generating a final sequence. The final sequence may be usable as a pilot sequence and may have a null portion, a flat frequency response, and zero autocorrelation at non-zero lags.

At 630, in the illustrated embodiment, a respective instance of the first sequence is padded with zeros.

At 640, in the illustrated embodiment, it is determined whether a FT of the zero-padded instance of the first sequence has a flat magnitude. In some embodiments, if the FT has a flat magnitude, the method ends at this point, i.e., without performing method elements 650 and 660 for the iteration in which the FT has a flat magnitude. If the FT does not have a flat magnitude, the method may proceed with one or more subsequent iterations.

At 650, in the illustrated embodiment, the phase of a second sequence that has a desired frequency response is adjusted to match a phase of the FT of the respective zero-padded instance of the first sequence, to produce an adjusted second sequence.

At 660, in the illustrated embodiment, an inverse FFT of the adjusted second sequence is determined to generate an inverse FT result. In the illustrated embodiment, the inverse FT result is used as the respective instance of the first sequence in the next iteration. The adjustment to the second sequence and the first sequence each iteration may result in a value of $|||Ch|-|d|||_2^2$ that is smaller than or equal to a previous iteration.

In some embodiments, the disclosed techniques are used to generate multiple zero-padded pilot sequences that are usable in parallel in a wireless communications cell. The pilot sequences may meet a cross-correlation threshold requirement to reduce interference between devices in the cell. In some embodiments, a computing device may determine the multiple pilot sequences, which may then be stored by mobile devices and base stations in a particular network. In some embodiments, the mobile devices and/or base stations may generate pilot sequences themselves and communicate the pilot sequences with other cellular network elements.

Exemplary Devices

In some embodiments, a mobile device (e.g., one of mobile devices 106) configured to store, generate, and/or transmit the disclosed pilot symbols may be a device with cellular communication capability such as a mobile phone, a hand-held device, a wearable device, a computer or a tablet, or virtually any type of wireless device.

The mobile device may include a processor that is configured to execute program instructions stored in memory. The mobile device may perform any of the method embodiments described herein by executing such stored instructions. Alternatively, or in addition, the mobile device may include a programmable hardware element such as an FPGA (field-programmable gate array) that is configured to perform any of the method embodiments described herein, or any portion of any of the method embodiments described herein.

The mobile device may include one or more antennas for communicating using one or more wireless communication protocols or technologies. The mobile device may include a radio which may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

The mobile device may include a system on chip (SOC), which may include portions for various purposes. For example, SOC may include processor(s) which may execute program instructions for the mobile device and display circuitry which may perform graphics processing and provide display signals to the display. The processor(s) may also be coupled to memory management unit (MMU), which may be configured to receive addresses from the processor(s) and translate those addresses to locations in memory and/or to other circuits or devices, such as the display circuitry, wireless communication circuitry, a connector I/F, and/or the display. The MMU may be configured to perform memory protection and page table translation or set up. In some embodiments, the MMU may be included as a portion of the processor(s).

The SOC may be coupled to various other circuits of the mobile device. For example, the mobile device may include various types of memory (, a connector interface (e.g., for coupling to a computer system, dock, charging station, etc.), the display, and wireless communication circuitry (e.g., for LTE, Wi-Fi, GPS, etc.).

In some embodiments, a base station (e.g., base station 102) that is configured to store, generate, and/or transmit the disclosed pilot symbols may processor(s) which may execute program instructions for the base station. The processor(s) may also be coupled to memory management unit (MMU), which may be configured to receive addresses from the processor(s) and translate those addresses to locations in memory or to other circuits or devices.

The base station may include at least one network port. The network port may be configured to couple to a telephone network and provide a plurality of devices, such as mobile device 106, access to the telephone network as described above in FIG. 1.

The network port (or an additional network port) may also or alternatively be configured to couple to a cellular network, e.g., a core network of a cellular service provider. The core network may provide mobility related services and/or other services to a plurality of devices, such as UE devices 106. In some cases, the network port may couple to a telephone network via the core network, and/or the core network may provide a telephone network (e.g., among other UE devices serviced by the cellular service provider).

The base station may include at least one antenna, and possibly multiple antennas. The antenna(s) may be configured to operate as a wireless transceiver and may be further configured to communicate with UE devices 106 via a radio. The antenna may communicates with the radio via a communication chain. The communication chain may be a receive chain, a transmit chain or both. The radio may be configured to communicate via various wireless telecommunication standards, including, but not limited to, LTE, LTE-A, UMTS, CDMA2000, Wi-Fi, etc.

The base station may be configured to communicate wirelessly using multiple wireless communication standards. In some instances, the base station may include multiple radios, which may enable the base station to communicate according to multiple wireless communication technologies. For example, as one possibility, the base station may include an LTE radio for performing communication according to LTE as well as a Wi-Fi radio for performing communication according to Wi-Fi. In such a case, the base station may be capable of operating as both an LTE base station and a Wi-Fi access point. As another possibility, the base station may include a multi-mode radio which is capable of performing communications according to any of multiple wireless communication technologies (e.g., LTE and Wi-Fi).

The base station may include hardware and software components for implementing or supporting implementation of features described herein. The processor of the base station may be configured to implement part or all of the methods described herein, e.g., by executing program instructions stored on a memory medium (e.g., a non-transitory computer-readable memory medium). Alternatively, the processor may be configured as a programmable hardware element, such as an FPGA (Field Programmable Gate Array), or as an ASIC (Application Specific Integrated Circuit), or a combination thereof.

Embodiments of the present disclosure may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computing device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. An apparatus, comprising:
one or more processing elements configured to generate data that includes a pilot sequence with a null portion for channel estimation;
the pilot sequence is a complex-valued sequence generated by:
determining a constant amplitude zero autocorrelation (CAZAC) sequence as a first sequence;
iteratively performing the following operations on the first sequence until a Fourier Transform (FT) of a zero-padded instance of the first sequence has a flat magnitude, thereby generating a final sequence, wherein said iteratively performing comprises:
padding a respective instance of the first sequence with zeros;
determining whether a FT of the zero-padded instance of the first sequence has a flat magnitude;
adjusting the phase of a second sequence that has a desired frequency response to match a phase of the FT of the respective zero-padded instance of the first sequence, thereby producing an adjusted second sequence; and
determining an inverse FT of the adjusted second sequence to generate an inverse FT result, wherein the inverse FT result is used as the respective instance of the first sequence in a next iteration; and
the one or more processing elements being further configured to output the generated data, including the generated pilot sequence, to at least one other element for wireless transmission.

2. The apparatus of claim 1, the one or more processing elements being further configured to generate a plurality of final sequences using different CAZAC sequences as first sequences, wherein the plurality of final sequences are used as generated pilot sequences for multiple mobile devices.

3. The apparatus of claim 1, wherein the apparatus is a cellular network element.

4. The apparatus of claim 1, wherein a length of the second sequence is the same as a length of a respective zero-padded instance of the first sequence.

5. The apparatus of claim 1, wherein the pilot sequence is used for fractionally-spaced frequency domain equalization.

6. The apparatus of claim 1, wherein an autocorrelation of the pilot sequence is zero across all non-zero lags.

7. The apparatus of claim 1, wherein the iteratively performing further comprises constraining one or more elements in the inverse FT result that exceed a radius limit.

8. A method, comprising:
- determining, using at least one processing element, a constant amplitude zero autocorrelation (CAZAC) sequence as a first sequence;
- iteratively performing, using the at least one processing element, the following operations on the first sequence until a Fourier Transform (FT) of a zero-padded instance of the first sequence has a flat magnitude, thereby generating a final sequence, wherein said iteratively performing comprises:
  - padding a respective instance of the first sequence with zeros;
  - determining whether a FT of the zero-padded instance of the first sequence has a flat magnitude;
  - adjusting the phase of a second sequence that has a desired frequency response to match a phase of the FT of the respective zero-padded instance of the first sequence, thereby producing an adjusted second sequence; and
  - determining an inverse FT of the adjusted second sequence to generate an inverse FT result, wherein the inverse FT result is used as the respective instance of the first sequence in a next iteration; and
- outputting, using the at least one processing element, the final sequence to at least one other element as a pilot data sequence for channel estimation in wireless transmissions.

9. The method of claim 8, further comprising storing the final sequence in a cellular network element.

10. The method of claim 8, further comprising generating a plurality of final sequences using different CAZAC sequences as first sequences, wherein the plurality of final sequences are used as pilot data sequences by multiple mobile devices in communication with a cellular base station.

11. The method of claim 8, further comprising transmitting, using the at least one other element, the final sequence on a wireless channel to a destination device.

12. The method of claim 11, wherein the destination device uses fractionally-spaced frequency domain equalization.

13. The method of claim 8, wherein a length of the second sequence is the same as a length of a respective zero-padded instance of the first sequence.

14. The method of claim 8, wherein an autocorrelation of the final sequence is smaller than or equal to zero across all non-zero lags.

15. The method of claim 8, wherein the iteratively performing further comprises constraining one or more elements in the inverse FT result that exceed a radius limit.

16. A non-transitory computer-readable medium having instructions stored thereon being configured to program a computing device to perform operations comprising:
- determining a constant amplitude zero autocorrelation (CAZAC) sequence as a first sequence;
- iteratively performing the following operations on the first sequence until a Fourier Transform (FT) of a zero-padded instance of the first sequence has a flat magnitude, thereby generating a final sequence, wherein said iteratively performing comprises:
  - padding a respective instance of the first sequence with zeros;
  - determining whether a FT of the zero-padded instance of the first sequence has a flat magnitude;
  - adjusting the phase of a second sequence that has a desired frequency response to match a phase of the FT of the respective zero-padded instance of the first sequence, thereby producing an adjusted second sequence; and
  - determining an inverse FT of the adjusted second sequence to generate an inverse FT result, wherein the inverse FT result is used as the respective instance of the first sequence in a next iteration; and
- outputting the final sequence from the computing device as a pilot sequence for channel estimation in wireless communications.

17. The non-transitory computer-readable medium of claim 16, wherein the operations further comprise transmitting the final sequence to a cellular network element.

18. The non-transitory computer-readable medium of claim 16, wherein a length of the second sequence is the same as a length of a respective zero-padded instance of the first sequence.

19. The non-transitory computer-readable medium of claim 16, wherein an autocorrelation of the final sequence is smaller than or equal to zero across all non-zero lags.

20. The non-transitory computer-readable medium of claim 16, wherein the iteratively performing further comprises constraining one or more elements in the inverse FT result that exceed a radius limit.

* * * * *